US006622437B2

(12) United States Patent
Nerger

(10) Patent No.: US 6,622,437 B2
(45) Date of Patent: Sep. 23, 2003

(54) LOAD-MOMENT SUPPORT

(75) Inventor: Klaus Nerger, Neukirchen-Vluyn (DE)

(73) Assignee: Demag Cranes & Components GmbH, Wetter (DE)

( * ) Notice: Subject to any disclaimer, the term of this patent is extended or adjusted under 35 U.S.C. 154(b) by 77 days.

(21) Appl. No.: 09/998,434

(22) Filed: Nov. 30, 2001

(65) Prior Publication Data

US 2002/0066244 A1 Jun. 6, 2002

Related U.S. Application Data

(60) Provisional application No. 60/260,578, filed on Jan. 8, 2001.

(30) Foreign Application Priority Data

Dec. 5, 2000 (DE) ........................................ 100 61 341

(51) Int. Cl.[7] ............................ F16B 9/02; B66F 19/00

(52) U.S. Cl. ...................... 52/122.1; 52/125.2; 52/712; 52/749.1; 52/736.4; 52/737.5; 254/4 R

(58) Field of Search ............................ 52/122.1, 125.2, 52/126.6, 749.1, 712, 736.4, 737.5; 254/4 R, 387

(56) References Cited

U.S. PATENT DOCUMENTS 5,403,110 A 4/1995 Sammann
5,697,725 A * 12/1997 Ballash et al. ............ 52/712 X

FOREIGN PATENT DOCUMENTS

| | | |
|---|---|---|
| DE | 43 42 716 A1 | 6/1995 |
| EP | 0 870 935 A | 10/1998 |

* cited by examiner

*Primary Examiner*—Laura A. Callo
(74) *Attorney, Agent, or Firm*—Henry M. Feiereisen

(57) ABSTRACT

A load-moment support for an attachment element to be secured one end of a longitudinal aluminum profile, includes a frame structure which embraces four outer sides at the end of the longitudinal aluminum profile in a without play manner. The frame structure has lower abutment surfaces to rest, respectively, against a first pair of opposite outer sides at a level with an end face of the longitudinal aluminum profile, and two tilting edges arranged, respectively, on a second pair of opposite outer sides and extending flush with the end side of the longitudinal aluminum profile. The attachment element arranged at the end face of the longitudinal aluminum profile abuts without play against the end face of the aluminum profile as well as against the tilting edges and the lower abutment surfaces of the frame structure and is secured at least to the abutment surfaces.

10 Claims, 4 Drawing Sheets

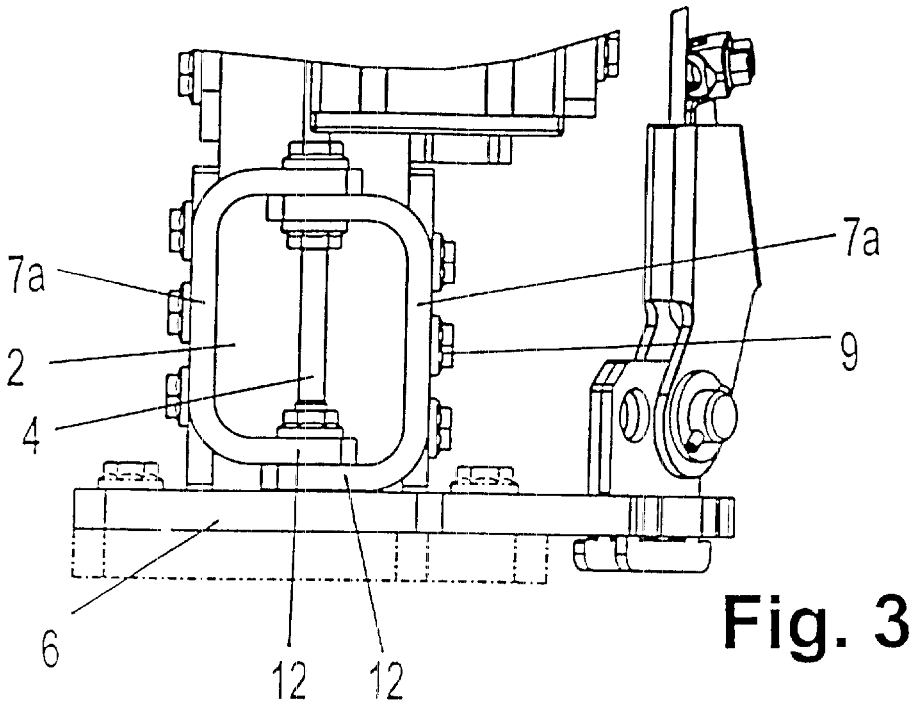
Fig. 3
Fig. 4
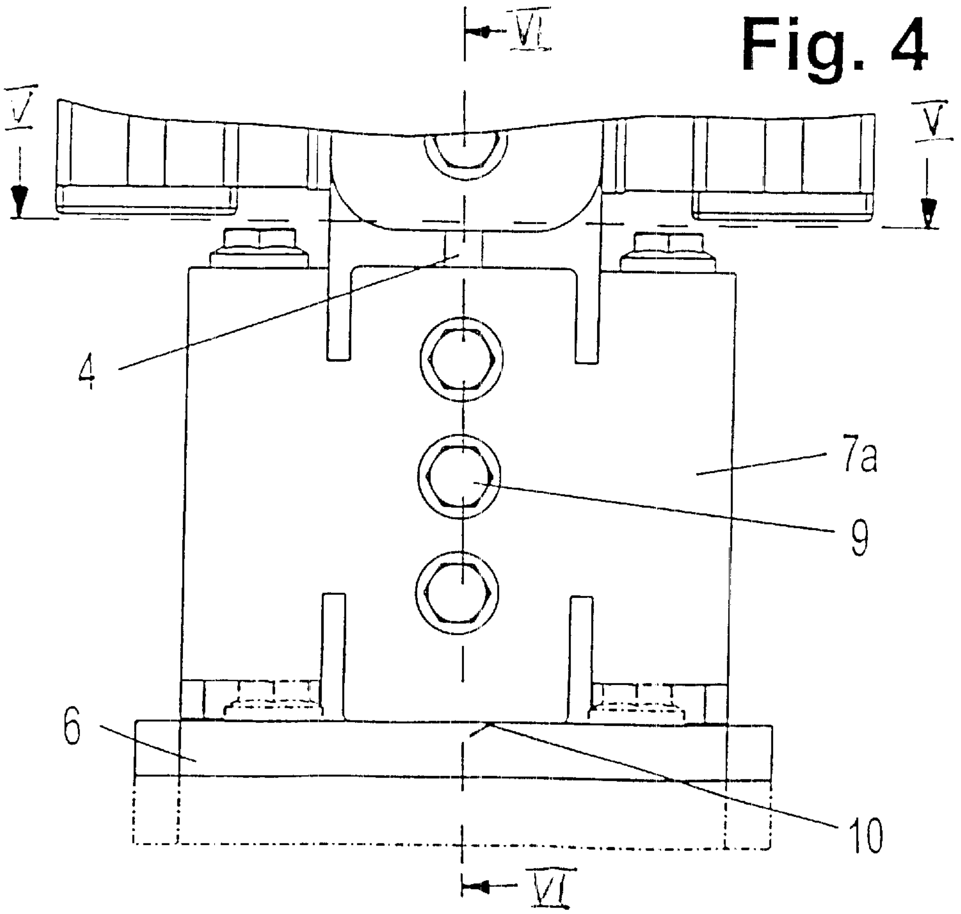

LOAD-MOMENT SUPPORT

CROSS-REFERENCES TO RELATED APPLICATIONS

This application claims the benefit of prior filed provisional application, Appl. No. 60/260,578, filed Jan. 8, 2001, pursuant to 35 U.S.C. 119(e), the subject matter of which is incorporated herein by reference.

This application claims the priority of German Patent Application Serial No. DE 100 61 341.1, filed Dec. 5, 2000, the subject matter of which is incorporated herein by reference.

BACKGROUND OF THE INVENTION

The present invention relates, in general, to a load-moment support, and more particularly to a load-moment support intended for use with an attachment element mounted to one end of a longitudinal aluminum profile of a lifting apparatus.

It is generally known to mount, for example, tools to an end face of a lifting beam via a load-moment support in the form of a flange plate. German Pat. No. DE 43 42 716 A1 discloses, for example, a lifting upright with a lifting beam having an end face for attachment of a parallel gripper via an interposed flange plate, which is usually welded to the end face of the lifting beam. A drawback of such a securement of the load-moment support is the inability to transfer such a load-moment support to a lifting beam in the form of a longitudinal aluminum profile.

It would therefore be desirable and advantageous to provide an improved load-moment support, which obviates prior art shortcomings and can be secured to an end face of a longitudinal aluminum profile while still being able to absorb high loads.

SUMMARY OF THE INVENTION

According to one aspect of the present invention, a load-moment support includes a frame structure which embraces four outer sides at the end of the longitudinal aluminum profile in a play-free manner, with the frame structure having lower abutment surfaces to rest, respectively, against a first pair of opposite outer sides at a level with an end face of the longitudinal aluminum profile, and two tilting edges arranged, respectively, on a second pair of opposite outer sides and extending flush with the end side of the longitudinal aluminum profile; and fasteners for securing the attachment element at least to the lower abutment surfaces at the end face of the longitudinal aluminum profile in such a manner that the attachment element abuts without play against the end face as well as against the tilting edges and against the lower abutment surfaces of the frame structure.

The present invention resolves prior art problems by providing a load-moment support which is so configured that the attachment element can be secured by a screw fastener which is subjected to tensile stress only acting along the screw fastener. All transverse forces are absorbed by the outer sides of the longitudinal aluminum profile via the abutment surfaces of the load-moment support (or torque support).

According to another feature of the present invention, the frame structure includes two base elements, and transverse elements, which are arranged on the base elements and are fixed to one another, wherein the base elements have abutment surfaces abutting without play against two opposite outer sides of the longitudinal aluminum profile, and the transverse elements have abutment surfaces abutting without play against the other two opposite outer sides of the longitudinal aluminum profile, wherein a transverse element of one base element is fixed to a transverse element of the other base element, with at least two spaced-apart pairs of transverse elements provided on each outer side, whereby the lowermost pair extends at a level with the end face of the longitudinal aluminum profile, and wherein each base element has at least one tilting edge which is arranged flush with the end face of the longitudinal aluminum profile, and wherein the attachment element, which is fastened on the end face, abuts without play against the end face as well as against each tilting edge and against the two lower pairs of transverse elements and is fastened at least on the lower pairs of transverse elements.

A play-free and reliable abutment of the attachment element can be realized by securing the attachment element on the end face of the longitudinal aluminum profile by means of a screw fastener.

According to another feature of the present invention, the base elements and the transverse elements are of plate-like configuration, thereby realizing a particularly simple structure. Suitably, the transverse elements are located in parallel planes extending transversely to the base elements.

In order to ensure a transfer of the forces being introduced into the longitudinal aluminum profile via the load-moment support, the transverse elements may be firmly connected to one another by screw fasteners.

According to another feature of the present invention, the frame structure has two such transverse elements at one end of each of the base elements and two such transverse elements at the other end of each of the base elements, wherein the transverse elements at each of the ends of each base element are disposed at a same level and extend conically toward one another. In this way, a sufficient form-fit can be implemented, while taking into account production tolerances.

According to another feature of the present invention, each of the base elements is made of sheet metal, with the transverse elements on the same end being formed through 90° bending with respect to the base element.

A cost-effective feature of the load-moment support involves the fabrication of each of the base elements with the transverse elements in a U-shaped configuration, whereby the two base elements with the transverse elements engage one another, when mounted to the longitudinal aluminum profile.

According to another feature of the present invention, the lower one of the pairs of transverse elements is spaced from the confronting attachment element at formation of a gap-shaped clearance before final securement of the attachment element, whereby the clearance is closed as the attachment element is drawn during final securement to the lower one of the pairs of transverse elements under a remaining elastic force application. In this way, the attachment element is drawn in an elastically prestressed manner against the tilting edges of the base elements and the end face of the longitudinal aluminum profile.

Installation of the load-moment support according to the present invention can be simplified by forming the longitudinal aluminum profile with longitudinal grooves for securement of the base elements by means of sliding blocks.

BRIEF DESCRIPTION OF THE DRAWING

Other features and advantages of the present invention will be more readily apparent upon reading the following description of a preferred exemplified embodiment of the invention with reference to the accompanying drawing, in which:

FIG. 3 is a front view of the load-moment support of FIG. 2;

FIG. 4 is a side view of the load-moment support of FIG. 3;

DETAILED DESCRIPTION OF PREFERRED EMBODIMENTS

Figure 1:
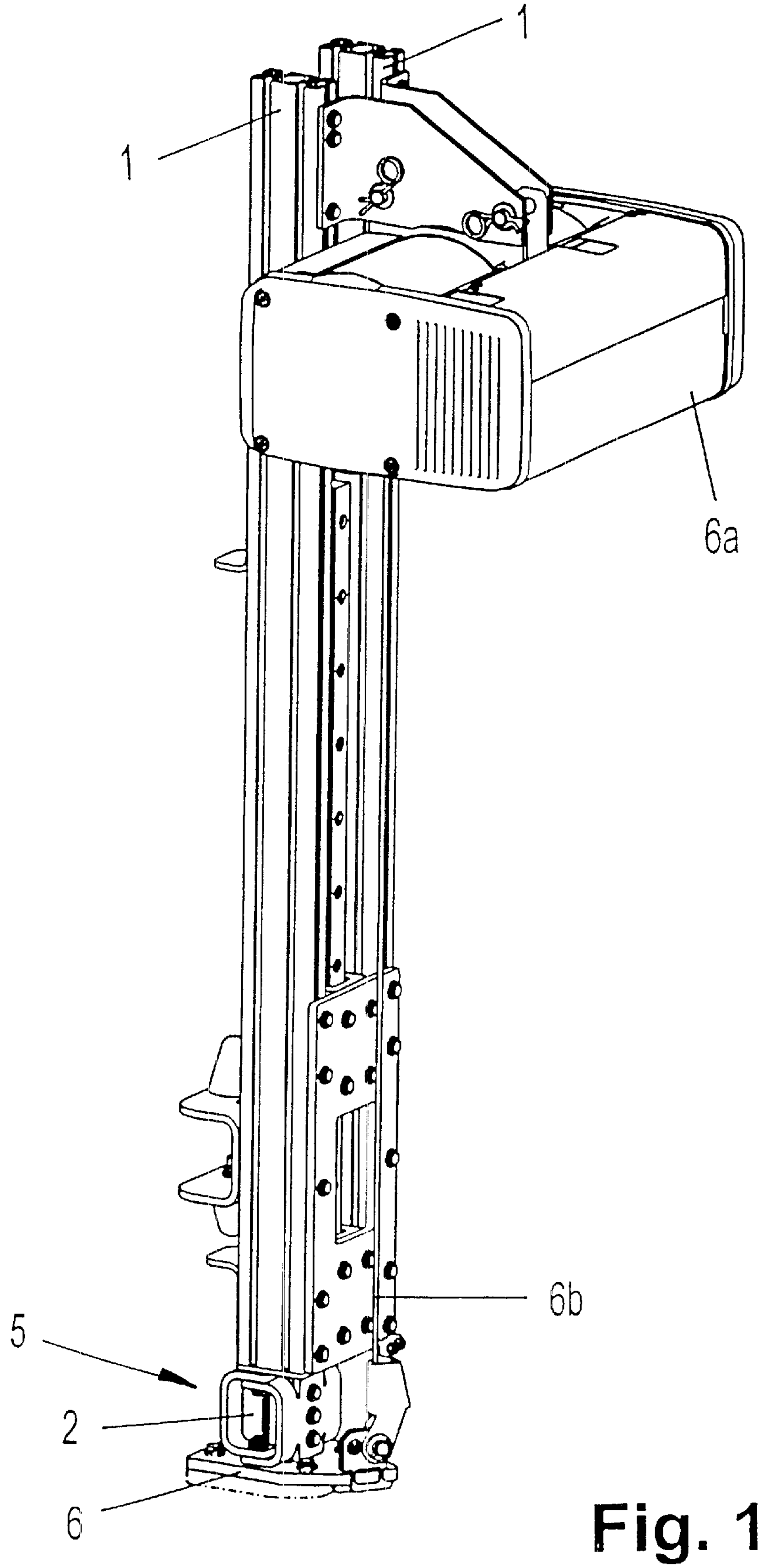
FIG. 1 is a perspective illustration of a lifting apparatus with a lifting upright incorporating a load-moment support according to the present invention.

Throughout all the Figures, same or corresponding elements are generally indicated by same reference numerals.

Figure 5:
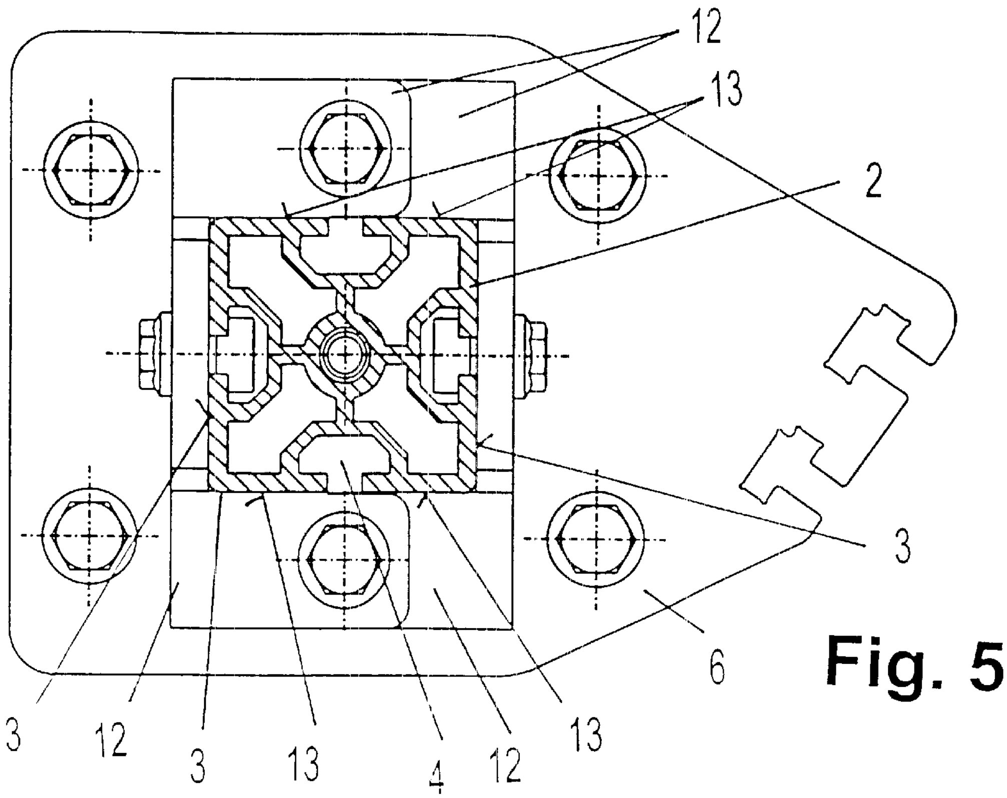
FIG. 5 is a cross sectional view of the lifting upright, taken along the line V—V in FIG. 4.

Turning now to the drawing, and in particular to FIG. 1, there is shown a perspective illustration of a lifting apparatus with a lifting upright having two spaced-apart parallel longitudinal members 1 which are each made from a longitudinal aluminum profile. Movably mounted between the two longitudinal members 1 is a lifting beam 2, which is made from a longitudinal aluminum profile and has an outer surface 3 formed with a multiplicity of parallel longitudinal grooves 4, as best seen in FIG. 5. Arranged at the lower end of the lifting beam 2, as shown in FIG. 1, is a load-moment support, generally designated by reference numeral 5 and having a beam-distal end face for attachment of a plate-shaped attachment element 6. Although not shown in detail, a carrier may be mounted to the attachment element 6 in a direction transversely to the lifting beam 2. The lifting beam 2 can be moved by a cable balancer **6*a* having a cable 6*b* secured with its fee end to the attachment element 6**.

Figure 2:
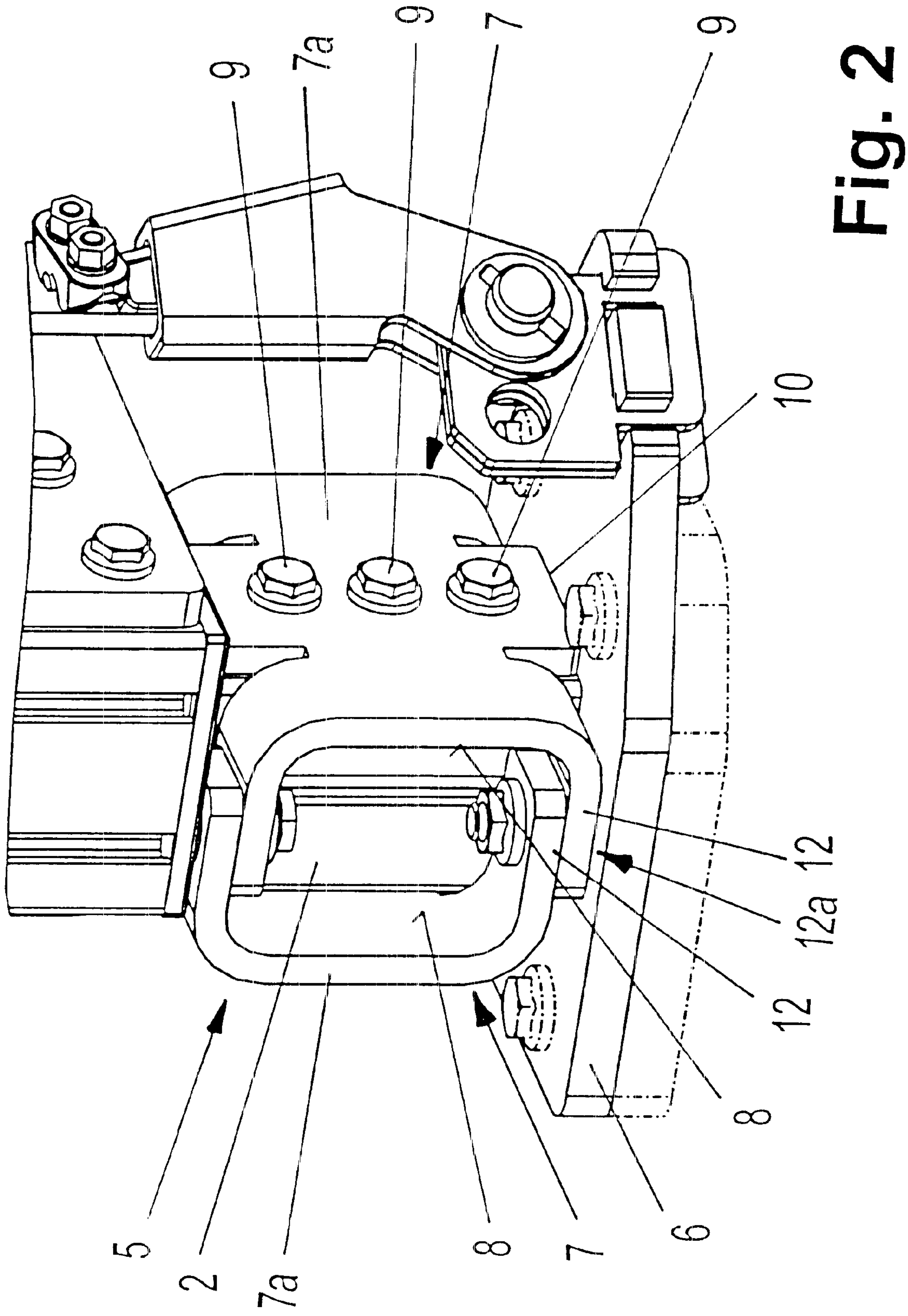
FIG. 2 is an enlarged cutaway view of the load-moment support of FIG. 1.

Turning now to FIG. 2, there is shown an enlarged illustration of the load-moment support 5. The load-moment support 5 is formed by two U-shaped elements 7 made of metal sheet and engaging one another to embrace the lifting beam 2. Each U-shaped element 7 includes two plate-like base elements **7*a* which are arranged parallel to one another and have each an abutment surface 8, whereby the abutment surfaces 8 of the opposing base elements 7 rest without play against two confronting outer sides 3 of the lifting beam 2. Securement of the base elements 7*a* in a virtually load-free fashion is realized by sliding blocks 9 or sliding-block strips for engagement behind the associated longitudinal grooves 4, as shown in FIG. 5, thereby effecting a simplified installation. As shown in FIGS. 2 to 4, the abutment surfaces 8 of the base elements 7*a* extend parallel to one another. At its side confronting the attachment element 6, the base element 7*a* is formed with a tilting edge 10, which is in flat engagement against the attachment element 6. Each base element 7*a* has at least one such tilting edge 10, which extends at least over part of the width of the base element 7*a*. The tilting edges 10 (abutment surfaces) extend flush with the end face of the lifting beam 2. The attachment element 6 is mounted to the end face of the lifting beam 2 by a central screw 11 (FIG. 6**), which absorbs essentially all load forces.

Each of the U-shaped elements 7 has confronting transverse elements 12 bearing on the other two outer sides 3 of the lifting beam 2. These tab-like transverse elements 12 are produced from sheet metal through 90° bending in relation to the base element **7*a*. The transverse elements 12 have inner surfaces which define abutment surfaces 13 that are directed toward the outer sides 3 of the lifting beam 2 and abut without play against the respectively confronting outer sides 3 of the lifting beam 2, as shown in particular in FIGS. 5 and 6. Connection of the base elements 7*a* is realized by mounting the transverse elements 12 of one base element 7*a* to the respectively adjacent transverse elements 12 of the other base element 7*a* via suitable screw fasteners 14. The load-moment support 5 thus has four pairs of transverse element 12, with two pairs located on one outer side 3 and two pairs of transverse element 12 located on the opposite outer side 3 of the lifting beam 2**.

Figure 6:
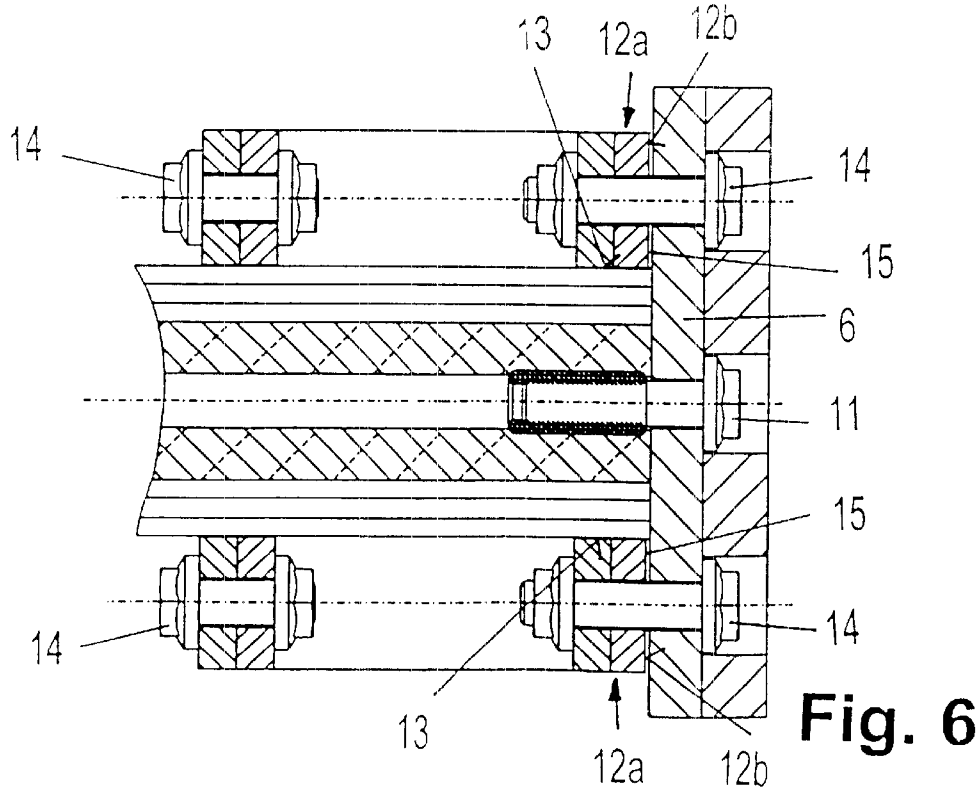
FIG. 6 is a longitudinal section through the lifting upright, taken along the line VI—VI in FIG. 4.

As shown in FIG. 6, each pair of transverse elements 12 adjacent the attachment element 6 and generally designated by reference numeral **12*a* is additionally bolted to the attachment element 6 by a screw 14 such that the screw 14 simultaneously draws the attachment element 6 in contact with the pair 12*a* of transverse elements 12. FIG. 6 shows the installation state immediately before the screws 14 have been fully tightened. In this state, a gap-like clearance 15 is still encountered between the abutment surface 12*b* and the attachment element 6 but will be closed as the screw 14 is fully tightened and an elastic force remains so that the attachment element 6 is drawn firmly against the tilting edge 10 without play. As a consequence, the lower pair 12*a* of transverse elements 12 has an abutment surface 12*b* in confronting relationship to the attachment element 6, which abutment surface 12*b* extends substantially flush with the end face of the lifting beam 2, and, as a consequence of the bolted connection via the screw fastener 11, the attachment element 6 bears continuously without play against the end face of the lifting beam 2**.

In order to better compensate production tolerances, the abutment surfaces 13 are suitably tapered toward one another.

Of course, the configuration of the transverse elements 12 is shown by way of example only, and other configurations, which generally follow the concepts outlined here, are considered to be covered by this disclosure. For example, it is conceivable to weld the transverse elements 12 to the base elements **7*a*, or to cast the U-shaped elements 7 so as to mold the transverse elements 12 onto the base elements 7*a***.

The non-limiting embodiment shown in the drawing essentially exhibits a load-moment support 5 in the form of a frame structure which includes two base elements **7*a* and transverse elements 12 interconnected via the base elements 7*a*. The frame structure embraces the outer sides 3 of the lifting beam 2 in the form of a longitudinal aluminum profile at the end thereof and abuts without play against all four outer sides 3 of the lifting beam 2. Disposed on two opposite outer sides 3, the frame structure has a lowermost abutment surface (of the pair 12*a* of the transverse elements 12) and, on the other two opposite outer sides 3, the frame structure has at least one tilting edge 10, which is arranged flush with the end face of the lifting beam 2. The lowermost abutment surface extends flush with the end face of the lifting beam 2, and the attachment element 6, which is mounted to the end face of the lifting beam 2, abuts in a play-free manner against this end face as well as against each tilting edge 10** and against the lowermost abutment surfaces of the frame structure, and is secured at least to the abutment surfaces.

While the invention has been illustrated and described as embodied in a load-moment support, it is not intended to be limited to the details shown since various modifications and structural changes may be made without departing in any way from the spirit of the present invention.

What is claimed as new and desired to be protected by Letters Patent is set forth in the appended claims:

1. A load-moment support for an attachment element to be secured to one end of a longitudinal aluminum profile, comprising:

a frame structure configured to embrace four outer sides at the end of the longitudinal aluminum profile in a play-free manner, wherein the frame structure has lower abutment surfaces to rest, respectively, against a first pair of opposite ones of said outer sides at a level with an end face of the longitudinal aluminum profile, and two tilting edges arranged, respectively, on a second pair of opposite ones of said outer sides and extending flush with the end side of the longitudinal aluminum profile; and fastening means for securing the attachment element at least to the lower abutment surfaces at the end face of the longitudinal aluminum profile in such a manner that the attachment element abuts without play against the end face as well as against the tilting edges and against the lower abutment surfaces of the frame structure.

2. The load-moment support of claim 1, wherein the frame structure includes two base elements having abutment surfaces to rest, respectively, against the second pair of said outer sides, and transverse elements interconnected via the base elements, wherein the transverse elements of one of the base elements are firmly connected to the transverse elements of the other one of the base elements such that each of the second pair of outer sides is abutted by at least two spaced-apart pairs of transverse elements, with a lower one of the pairs of transverse elements defining the lower abutment surfaces to rest without play against the first pair of the outer sides and extending at level with the end face of the longitudinal aluminum profile, wherein each of the base elements forms a one of said tilting edges.

3. The load-moment support of claim 2, wherein the base elements and the transverse elements have a plate-shaped configuration.

4. The load-moment support of claim 2, wherein the fastening means includes screw fasteners for firmly connecting the transverse elements to one another.

5. The load-moment support of claim 2, wherein the frame structure has two said transverse elements at one end of each of the base elements and two said transverse elements at another end of each of the base elements, wherein the transverse elements at each of the ends of each base element are disposed at a same level and extend conically toward one another.

6. The load-moment support of claim 5, wherein each of the base elements with the transverse elements define a U-shaped configuration, whereby the two base elements with the transverse elements engage one another, when mounted to the longitudinal aluminum profile.

7. The load-moment support of claim 2, wherein each of the base elements is made of sheet metal, with the transverse elements being formed through 90° bending with respect to the base element.

8. The load-moment support of claim 2, wherein the lower one of the pairs of transverse elements is spaced from the confronting attachment element at formation of a gap-shaped clearance before final securement of the attachment element, whereby the clearance is closed as the attachment element is drawn during final securement to the lower one of the pairs of transverse elements under a remaining elastic force application.

9. The load-moment support of claim 1, wherein the attachment element is firmly bolted to the end face of the longitudinal aluminum profile.

10. The load-moment support of claim 1, wherein the longitudinal aluminum profile has longitudinal grooves for securement of the base elements by means of sliding blocks.

* * * * *